Nov. 10, 1925.
E. S. JOHNSON
LEG LOCKING DEVICE
Filed Dec. 9, 1922
1,560,913
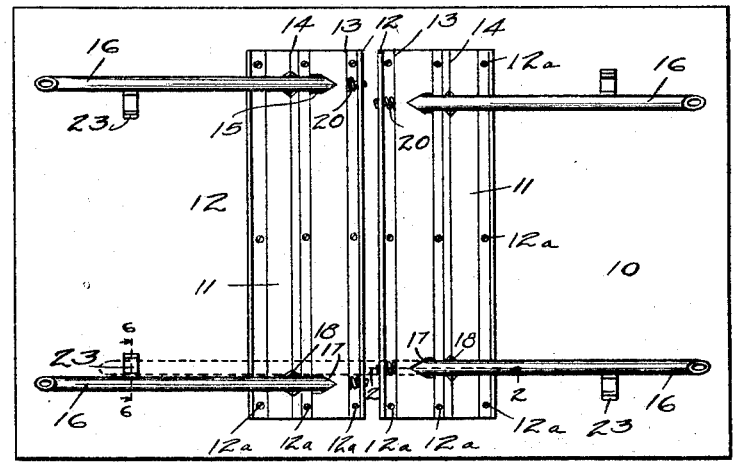
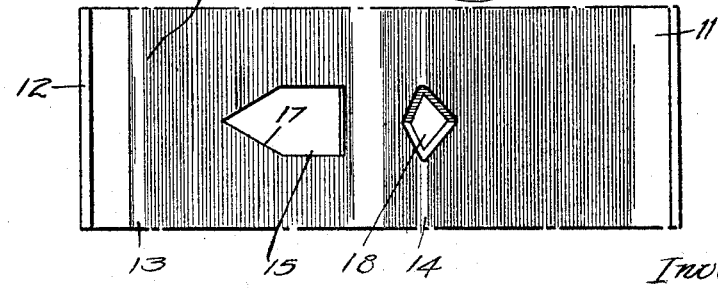
Inventor
Ernest S. Johnson
By Bair & Freeman Attys
Witness
Lynn Latta Patented Nov. 10, 1925.

1,560,913

UNITED STATES PATENT OFFICE.

ERNEST S. JOHNSON, OF WEBSTER CITY, IOWA.

LEG-LOCKING DEVICE.

Application filed December 9, 1922. Serial No. 605,987.

*To all whom it may concern:*

Be it known that I, ERNEST S. JOHNSON, a citizen of the United States, and a resident of Webster City, in the county of Hamilton and State of Iowa, have invented certain new and useful Leg-Locking Devices, of which the following is a specification.

The object of my invention is to provide a structure wherein a leg for supporting a device or platform may be locked in position, which is simple to operate and very efficient.

More particularly, it is my object to provide a structure wherein supporting legs may be pivotally and flexibly secured to a member for permitting movement of the leg members when necessary.

Still another object is to provide a member for receiving the upper ends of the legs whereby they will be held in position and a brace member for engaging the legs for preventing any lateral or pivotal movement of the legs.

Still a further object is to provide a spring member for securing the upper end of the legs to a stationary member for permitting the upper ends thereof to be inserted or withdrawn from a receiving member and giving the legs practically a universal movement when they are not in their operative position.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a view of an underside of a plate or supporting element with my improved leg locking structure shown thereon.

Figure 2 is a detail, sectional view taken on line 2—2 of Figure 1, showing one of the leg locks.

Figure 3 is a detail, sectional view taken on line 3—3 of Figure 2.

Figure 4 is a detail view of the underside of the member for receiving the legs.

Figure 5 shows the upper end of one of the legs; and

Figure 6 is a detail, sectional view taken on line 6—6 of Figure 1 showing the clip for locking the leg in position.

In the accompanying drawings, I have used the reference numeral 10 to indicate generally a supporting element or plate which may be of any desired shape or outline. Secured to the underside of the plate or support 10 are a pair of members 11. The members 11 are secured to the plate 10 by means of the screws 12$^a$.

One of the marginal edges of the member 11 is provided with a downturned flange 12. A pair of ridges 13 and 14 are formed on each of the members 11 so that when the member 11 is secured to the plate 10, the shape in cross section is substantially that as shown in Figure 2 of the drawings.

In the ridge 13 near the lower part thereof are the openings 15. The openings 15 are designed to receive the upper ends of legs 16. The legs 16 are preferably formed of sheet metal tubing.

The openings 15 are provided with converging walls 17 wherein one end of the opening will be tapered. Tapered openings 18 are formed in the ridge 14 of the members 11 and are positioned in substantial alignment with each of the openings 15. One opening 15 and one opening 18 are used for locking the leg in position.

The upper end of a leg 16 is inserted in the opening 15 and a portion of the leg will rest against the converging walls 17 of the opening 15. The leg then extends downwardly and away from the member 11 and will be partially received within the tapered opening 18 in the ridge 14.

The receiving of the leg 16 within the opening 18 prevents any possible pivotal and lateral movement of the leg and serves as a brace means for the leg. The upper end of the leg will become firmly wedged into the tapered portion of the opening 15 while the opening 18 will also receive a portion of the leg and thus brace it against any undesired movement in any direction.

It may be mentioned that the greater the pressure or weight applied upon the supporting element or plate, the firmer the leg will be locked in position. In the drawings, I have shown four legs used in supporting the plate or supporting element 10, but it will be understood that the leg lock structure may be used with three or more legs if desired.

The upper ends of the legs 16 are provided with a tongue 19 to which is anchored one end of a spring 20. The spring 20 extends through an opening 21 and is anchored through an opening 22 formed in the flange 12. A spring 20 is provided for each of the legs 16. The spring 20 tends to draw the upper end of the leg 16 into the tapered portion of the opening 15. The spring 20 permits the leg 16 to be withdrawn from the opening 15 but prevents the leg from being detached from the member 11.

In order to lock the legs along the underside of the plate or support 10, I provide clips 23 which receive the legs when they are in their inoperative position. One of the legs 16 is shown in dotted lines in its inoperative position in Figure 1. When four legs are used, they are so postioned that they may be folded over and moved to inoperative position without interfering with the corresponding legs secured to the other member 11.

The position that the upper ends of the legs and the springs will take when moved to inoperative position is clearly shown in Figure 2 of the drawings in dotted lines.

It will be seen that I have provided a leg locking structure wherein the upper end of the leg is locked and brace means for preventing any lateral movement of the leg thus causing the leg to be securely locked in position. By providing the opening 15 with a tapered portion and employing the tapered opening 18 makes it possible to frictionally lock the legs 16 against any sliding or lateral movement.

It will be seen that the member 11 is formed of a plate of material which can be very easily shaped and which forms a very cheap but efficient construction. While I have shown the legs made of metal tubing, it will be understood that wooden legs may be used with my locking structure.

Some changes may be made in the construction, and arrangement of the various parts of my invention without departing from the real spirit and purpose of my invention and it is my intention to cover by my claims, any modified forms of structure or use of mechanical equivalents, which may be reasonably included within their scope.

I claim as my invention:

1. A leg lock structure comprising a supporting plate or the like, a member rigidly secured to the underside thereof and having parts spaced away therefrom, said member having elongated tapered openings therein, a plurality of movable legs arranged to have their upper ends when in a certain position to be received in said openings and rest against the underside of said plate, spring means for pivotally connecting said legs to said first member tending to draw said legs against the edges of said tapered openings and means for preventing lateral movement of said legs when in operative position.

2. A leg lock structure comprising a supporting plate or the like, a member rigidly secured to the underside thereof and having parts spaced away therefrom, said member having elongated tapered openings therein, a plurality of movable legs arranged to have their upper ends when in a certain position to be received in said openings and rest against the underside of said plate, means tending to draw the legs into said tapered openings, and means for preventing lateral movement of said legs when in operative position, said means engaging the legs at a point spaced a substantial distance from the upper end of the legs which are received in the tapered openings.

3. A leg lock structure comprising a supporting plate or the like, a member rigidly secured to the underside thereof and having parts spaced away therefrom, said member having elongated openings therein, a plurality of movable legs arranged to have their upper ends when in a certain position to be received in said openings and rest against the underside of said plate, means for loosely and flexibly securing said legs to said member for permitting them to swing into and out of said member and means for bracing said legs when in operative position for preventing any lateral movement thereof, said last means having openings therein for receiving the legs.

4. A leg lock structure comprising a plate, a member rigidly supported on said plate and spaced therefrom, having longitudinally elongated holes therein, a plurality of movable legs arranged to have their upper ends, when the legs are in a certain position, to project through said openings and to rest against the underside of said plates, and a brace means for engaging said legs at points spaced from said member, when the legs are inclined downwardly and away from said plate, said brace means being adapted to prevent lateral movement of the legs, said brace means being formed by a member having a tapered opening therein for receiving the leg, whereby the greater the pressure upon said plate, the tighter the leg will be locked in said brace means.

5. A leg lock structure comprising a supporting plate or the like, a member rigidly secured to the under side thereof, and having parts spaced away therefrom, said member having elongated openings therein, a plurality of movable legs arranged to have their upper ends when in a certain position to be received in said openings and rest against the underside of said plate, a loose and pivotal connection for securing the upper ends of said legs to said member, said connection tending to draw the legs into said member, brace means for engaging said legs intermediate of their ends for preventing lateral movement thereof when in operative position, said legs being capable of being swung to position substantially parallel with said support and a clip for retaining each leg in inoperative position.

Des Moines, Iowa, November 29, 1922.

ERNEST S. JOHNSON.